UNITED STATES PATENT OFFICE.

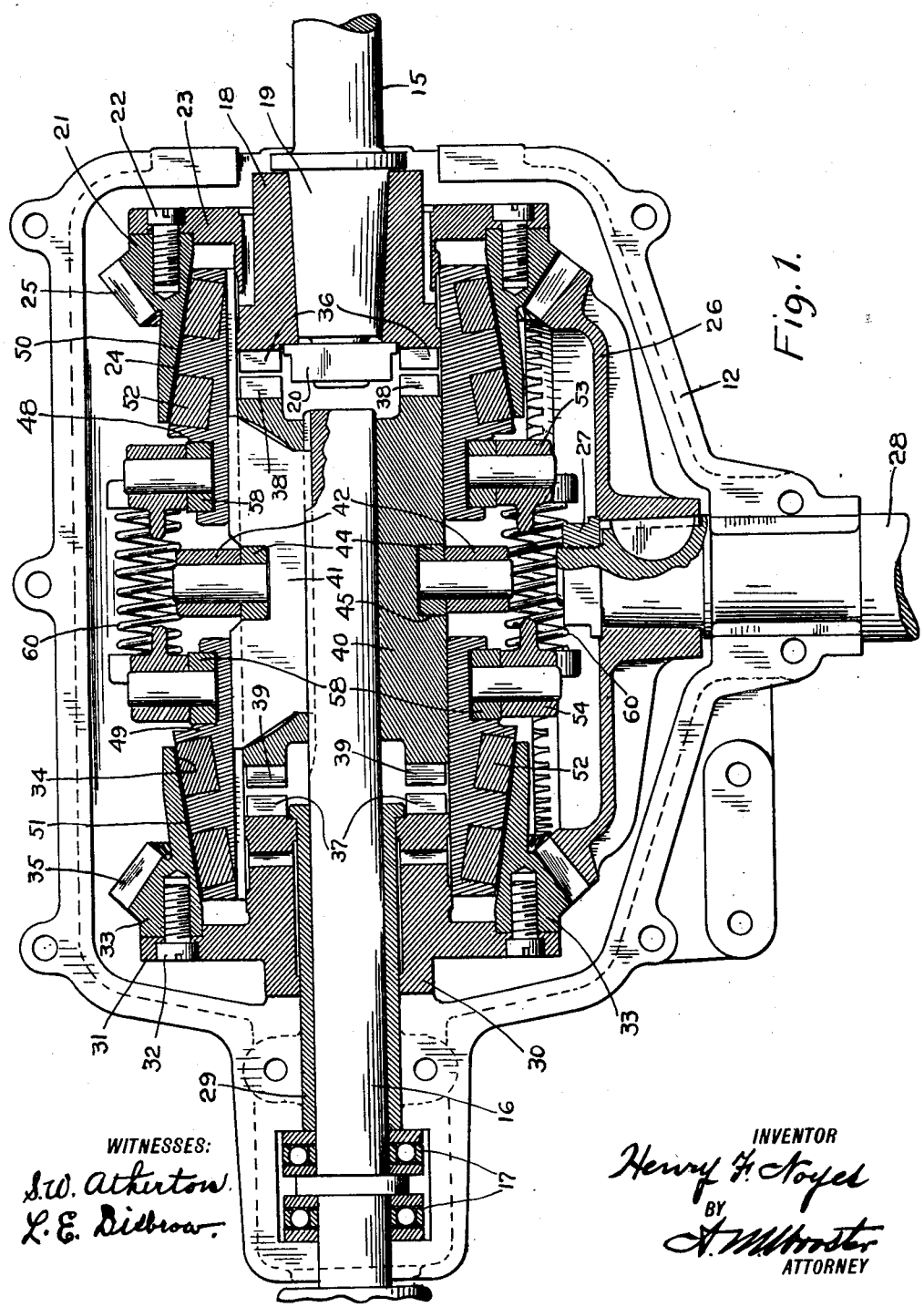

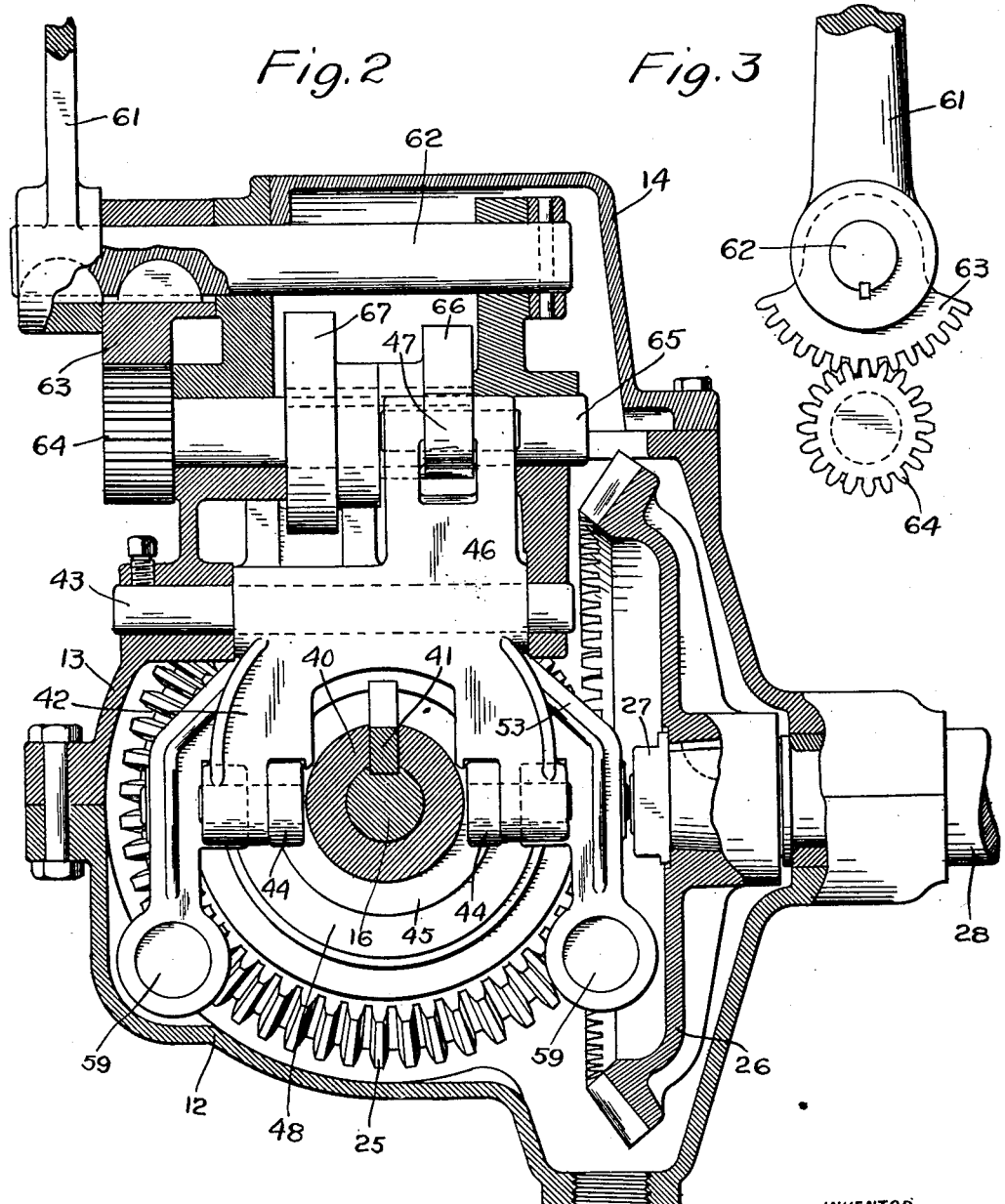

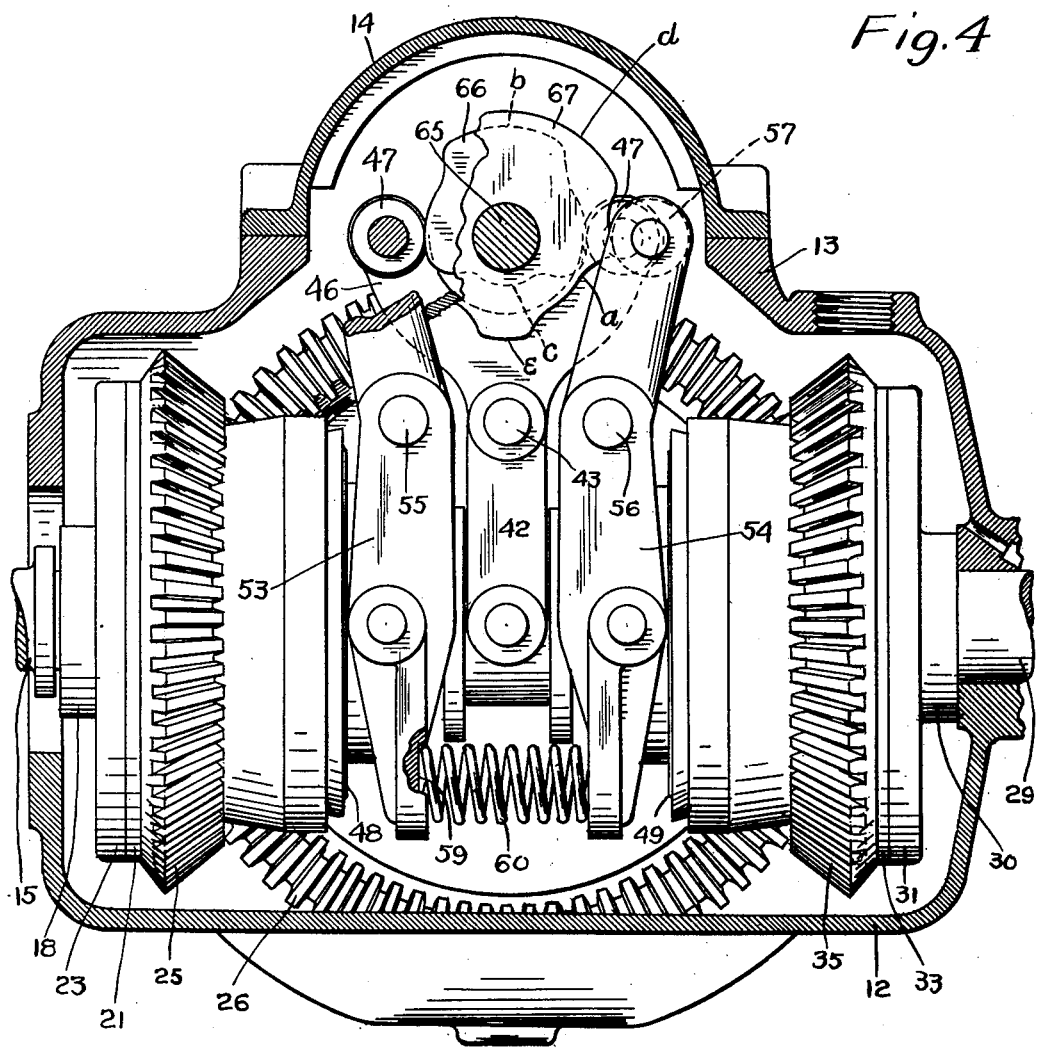

HENRY F. NOYES, OF BRIDGEPORT, CONNECTICUT, ASSIGNOR TO THE BLACK ROCK MACHINE COMPANY, OF BRIDGEPORT, CONNECTICUT, A CORPORATION OF CONNECTICUT.

COMBINED FRICTION AND JAW CLUTCH.

1,024,595.  Specification of Letters Patent.  Patented Apr. 30, 1912.

Application filed July 17, 1911. Serial No. 638,905.

*To all whom it may concern:*

Be it known that I, HENRY F. NOYES, a citizen of the United States, residing at Bridgeport, county of Fairfield, State of Connecticut, have invented an Improvement in Combined Friction and Jaw Clutches, of which the following is a specification.

This invention relates to clutch mechanism of the type employing frictional and positive clutch elements in which the frictional elements are first engaged to start the driven part without shock or jar, after which the positive elements are brought into engagement to produce a positive drive.

The invention has for its object to provide improved clutch mechanism of the type referred to having controlling means whereby the engagement of the respective clutches will be positively timed so as to insure first the engagement of the frictional clutch and thereafter the engagement of the positive clutch.

The invention also contemplates the provision of means whereby after the engagement of the positive clutch elements the frictional elements may be disengaged in order to prevent unnecessary wear, particularly upon the rollers of the frictional clutch shifting device.

These and other objects of the invention, together with means whereby the same may be carried into effect, will best be understood from the following description of one form or embodiment thereof, illustrated in the accompanying drawings. It will be understood however that the construction described and shown has been chosen for illustrative purposes merely and that the invention may be embodied in other forms without departing from the spirit and scope thereof.

In said drawings: Figure 1 is a horizontal section, in the plane of the driving and driven shafts, of the clutch mechanism. Fig. 2 is a central transverse vertical section of the clutch mechanism and the controlling means therefor. Fig. 3 is a detail view of the operating lever and parts connected therewith. Fig. 4 is a vertical section, at right angles to Fig. 2, of the casing, showing the mechanism in elevation and partly broken away.

The clutch mechanism is shown as embodied in a transmission device designed to provide for a direct forward drive and a reverse drive of a driven shaft from a driving shaft continuously rotated in one direction and employing for this purpose two sets of clutch devices. It will be obvious however that one of these sets of clutch devices may be omitted in order to produce a single acting clutch without materially changing the construction and operation of the other set.

Referring to the drawings, 12 denotes the lower section of the gear casing, 13 the upper section thereof, and 14 a supplementary casing for housing the controlling mechanism.

15 denotes the driving shaft and 16 the driven shaft, the latter being journaled in a thrust bearing 17 between the casing parts.

18 denotes a sleeve fast on the driving shaft, as by being driven upon a tapered portion 19 of said driving shaft and held in place thereon by a nut 20.

21 denotes a combined gear and clutch ring secured, as by screws 22, to an annular flange 23 on the sleeve 18. Said ring 21 is provided with a conical frictional clutch face 24 and with teeth 25 constituting a bevel gear which meshes with a bevel gear 26 secured by a nut 27 to a shaft 28 supported in the casing.

29 denotes a sleeve or bushing within which the shaft 16 rotates and upon which is rotatably mounted a sleeve 30 having an annular flange 31 to which is secured, by means of screws 32, a combined gear and clutch ring 33 similar in all respects to the ring 21 and having a conical frictional clutch face 34 and teeth 35 forming a bevel gear meshing with the gear 26 at the side thereof opposite to the gear 25. The sleeve 18 being fast on the shaft 15 rotates continuously therewith, while the sleeve 30 is also continuously rotated by the shaft 15, but in the opposite direction, through the gears 25, 26 and 35.

The sleeves 18 and 30 are provided respectively with clutch teeth 36 and 37 adapted to be engaged respectively with clutch teeth 38 and 39 formed on opposite ends of a sleeve or double faced clutch hub 40 mounted on the shaft 16 for rotation therewith but adapted to slide longitudinally thereon. To this end the sleeve 40 is splined to the shaft 16 by means of a plate 41. With the sleeve 40 in the position shown in Fig. 1, the driven shaft is disconnected from both sleeves 18 and 30. Said sleeve 40 may be moved in either direction to cause its clutch projections to be brought into engagement with the clutch projections 36 or 37 by means of a clutch fork 42 mounted on a shaft 43 secured in the casing and provided with rollers 44 engaging a groove 45 in said sleeve 40. The upper end of the clutch fork 42 is bifurcated, the two branches thereof being provided with rollers 47 for a purpose to be presently explained.

48 and 49 denote a pair of sleeves mounted to slide upon the sleeve 40 and upon the sleeves 18 and 30 respectively, said sleeves 48 and 49 being rotatable with respect to the sleeves 18 and 30 but being splined to the sleeve 40 by means of the plate 41. The sleeve 48 is provided with a conical friction clutch face 50 adapted to coöperate with the clutch face 24 on the ring 21, and the sleeve 49 is provided with a similar clutch face 51 coöperating with the clutch face 34 of the ring 33.

52 denotes plugs or rings of any suitable friction material set into the faces 50 and 51.

The sleeves 48 and 49 are moved into and out of engagement with the rings 21 and 33 by means of clutch forks 53 and 54 pivoted at 55 and 56 to the casing and provided at their upper ends with rollers 57 for a purpose to be hereafter explained. Said clutch forks are provided at their lower ends with rollers 58 engaging grooves in the sleeves 48 and 49. The arms of the forks 53 and 54 are extended downwardly beyond the rollers 58 and are provided with recesses 59 for the reception of the ends of strong expansion springs 60 interposed between said clutch forks and tending normally to throw the respective friction clutch elements into engagement.

61 denotes an operating lever keyed to a shaft 62 journaled in the upper part of the casing and to which is keyed a segment 63 meshing with a pinion 64 on a cam shaft 65 journaled in the casing and provided with cams 66 and 67 lying respectively between the rollers 47 on the clutch fork 42 and the rollers 57 on the clutch forks 53 and 54. The forms of these cams can best be described in connection with the operation of the mechanism, which is as follows:

With the parts in the positions shown in the drawings the clutch devices are all disengaged and the driven shaft 16 is at rest. Let it be assumed that the operating lever is moved in a direction to rotate the shaft 65 through the pinion 64 in a direction from right to left as shown in Fig. 4. The first result of this movement will be to bring the low portion $a$ of the cam 67 opposite the roller 57 carried by the clutch fork 54, thereby permitting the springs 60 to move said fork and cause the engagement of the friction clutch faces 34 and 51. The shaft 16 will thereupon be driven frictionally from the sleeve 30 in a reverse direction with respect to the driving shaft 15. A further movement of the operating lever in the same direction will cause the high portion $b$ of the cam 66 to engage the roller 47 at the left in Fig. 4 and the low portion $c$ of said cam to be brought opposite the roller 47 at the right in said figure. This causes the clutch fork 42 to be oscillated in a direction to move the sleeve 40 toward the right in Fig. 4 or toward the left in Fig. 1, thereby engaging the clutch teeth 37 and 39 and causing the shaft 16 to be positively connected with the sleeve 30 and to be positively driven in a reverse direction with respect to the shaft 15. It will be understood that at this time the roller at the upper end of the clutcth fork 53 will be in engagement with the high part $d$ of the cam 67 so as to continue to hold the clutch faces 24 and 50 of the friction clutch member 21 and 48 out of engagement. After the clutch projections 37 and 39 have been firmly engaged a further movement of the lever 61 in the direction above referred to will cause the high portion $e$ of the cam 67 to engage the roller 57 of the clutch fork 54, thereby moving the clutch face 51 out of engagement with the clutch face 34, so that the parts will be driven through the positive connection only.

From the foregoing description of the operation of connecting the parts for a reverse drive it will be obvious that movement of the lever 61 from its central or neutral position in the direction opposite to that above referred to will cause successively the engagement of friction clutch faces 24 and 50, engagement of clutch projections 36 and 38, and finally disengagement of said friction clutch faces 24 and 50, thereby connecting the parts for a direct forward drive.

Having thus described my invention, I claim:

1. The combination with a driving element and a driven element, of a friction clutch connecting said elements, a positive clutch connecting said elements, a shaft, means for turning said shaft, and cams on said shaft for separately controlling the engagement of said clutches.

2. The combination with a driving element and a driven element, of a friction clutch connecting said elements, a positive clutch connecting said elements, clutch forks for operating said clutches, a shaft, means for turning said shaft, and cams on said shaft for operating said clutch forks.

3. The combination with a driving element and a driven element, of a friction clutch connecting said elements, a positive clutch connecting said elements, and cams for separately controlling said clutches to cause their successive engagement.

4. The combination with a driving element and a driven element, of a friction clutch connecting said elements, a positive clutch connecting said elements, and cams for controlling said clutches to cause their successive engagement and the subsequent disengagement of said friction clutch.

5. The combination with a driving shaft and a driven shaft, of a sleeve fast on one of said shafts, a sleeve loose on the other of said shafts, said sleeves being provided with clutch projections, a combined clutch and gear ring carried by each of said sleeves, a gear connecting said rings, means on said last named shaft for engaging said clutch projections, and other means on said last named shaft for frictionally engaging said rings.

6. The combination with a driving shaft and a driven shaft, of a sleeve fast on one of said shafts, a sleeve loose on the other of said shafts, said sleeves being provided with friction clutch faces, means for operatively connecting said sleeves, a clutch sleeve on said last named shaft having means for positively engaging said first named sleeves, clutch sleeves slidably mounted on said last named sleeve and said first named sleeves and provided with means for engaging said friction clutch faces, and devices for operating said clutch sleeves.

7. The combination with a driving shaft and a driven shaft, of a sleeve fast on one of said shafts, a sleeve loose on the other of said shafts, said sleeves being provided with clutch faces, means for operatively connecting said sleeves, a pair of clutch sleeves slidably mounted on said last named shaft and adapted to engage respectively the clutch faces on said first named sleeves, clutch forks for shifting said last named sleeves, and a spring interposed between said forks.

In testimony whereof I affix my signature in presence of two witnesses.

HENRY F. NOYES.

Witnesses:
A. M. WOOSTER,
S. W. ATHERTON.